United States Patent
Jia et al.

(10) Patent No.: US 10,463,063 B2
(45) Date of Patent: Nov. 5, 2019

(54) CONSUMABLES

(71) Applicant: GIVAUDAN SA, Vernier (CH)

(72) Inventors: Zhonghua Jia, Cincinnati, OH (US); Xiaogen Yang, West Chester, OH (US); Chad Allen Hansen, Kings Mills, OH (US); Charles Benjamin Naman, Cincinnati, OH (US); Christopher Todd Simons, Wyoming, OH (US); Jay Patrick Slack, Cincinnati, OH (US); Kimberley Gray, Loveland, OH (US)

(73) Assignee: GIVAUDAN S.A., Vernier (CH)

( * ) Notice: Subject to any disclaimer, the term of this patent is extended or adjusted under 35 U.S.C. 154(b) by 0 days.

(21) Appl. No.: 16/182,347

(22) Filed: Nov. 6, 2018

(65) Prior Publication Data

US 2019/0069580 A1  Mar. 7, 2019

Related U.S. Application Data

(63) Continuation-in-part of application No. 15/958,612, filed on Apr. 20, 2018, now abandoned, which is a
(Continued)

(51) Int. Cl.
A23L 2/60 (2006.01)
A23L 5/00 (2016.01)
(Continued)

(52) U.S. Cl.
CPC .............. *A23L 2/60* (2013.01); *A23C 9/1307* (2013.01); *A23C 9/156* (2013.01); *A23C 11/10* (2013.01); *A23C 11/103* (2013.01); *A23C 13/12* (2013.01); *A23C 17/00* (2013.01); *A23C 19/0925* (2013.01); *A23G 1/32* (2013.01); *A23G 1/40* (2013.01); *A23G 1/48* (2013.01); *A23G 3/36* (2013.01); *A23G 3/42* (2013.01); *A23G 3/48* (2013.01); *A23G 4/06* (2013.01); *A23G 4/068* (2013.01); *A23G 4/10* (2013.01); *A23G 9/32* (2013.01); *A23G 9/34* (2013.01); *A23G 9/42* (2013.01); *A23L 5/00* (2016.08); *A23L 7/126* (2016.08); *A23L 27/30* (2016.08); *A23L 27/34* (2016.08); *A23L 29/30* (2016.08); *A23C 2260/152* (2013.01); *A23L 33/125* (2016.08); *A23V 2002/00* (2013.01); *A23V 2250/25* (2013.01); *A23V 2250/60* (2013.01)

(58) Field of Classification Search
CPC . A23L 2/60; A23L 27/30; A23L 27/39; A23L 29/30
USPC .................................................. 426/548, 531
See application file for complete search history.

(56) References Cited

U.S. PATENT DOCUMENTS 3,087,821 A    4/1963  Horowitz et al.
3,429,873 A    2/1969  Horowitz et al.
(Continued)

FOREIGN PATENT DOCUMENTS

CH      592418 A5    10/1977
EP    1972203 A1     9/2008
(Continued)

OTHER PUBLICATIONS

Drewnowski, et al. "Bitter taste, phytonutrients, and the consumer: a review." Am J Clin Nurt, vol. 72, Issue 6, pp. 1424-1435, Dec. 2000.
(Continued)

*Primary Examiner* — Erik Kashnikow
*Assistant Examiner* — Lela S. Williams
(74) *Attorney, Agent, or Firm* — Curatolo Sidoti Co., LPA; Salvatore A. Sidoti; Floyd Trillis, III

(57) ABSTRACT

Disclosed are sweetened consumables and methods of forming said sweetened consumables that comprise certain sweeteners and a compound of formula (1),

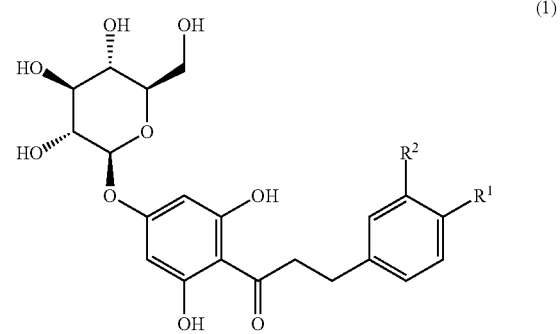

wherein $R^1$ is selected from the group consisting of OH and $OCH_3$, and $R^2$ is selected from the group consisting of H and OH, $R^1$ and $R^2$ comprise at least one OH group, and when $R^1$ is OH then $R^2$ is H (trilobatin), and when $R^1$ is $OCH_3$ then $R^2$ is OH (HDG), in a concentration near its sweetness detection threshold. The sweeteners include sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof.

19 Claims, No Drawings

Related U.S. Application Data continuation of application No. 14/799,003, filed on Jul. 14, 2015, now abandoned, which is a continuation of application No. 14/269,803, filed on May 5, 2014, now abandoned, which is a continuation of application No. 12/663,321, filed as application No. PCT/CH2008/000253 on Jun. 6, 2008, now abandoned.

(60) Provisional application No. 61/055,584, filed on May 23, 2008, provisional application No. 60/942,736, filed on Jun. 8, 2007.

(51) Int. Cl.
| | |
|---|---|
| A23L 27/30 | (2016.01) |
| A23L 7/126 | (2016.01) |
| A23L 29/30 | (2016.01) |
| A23G 9/42 | (2006.01) |
| A23G 9/34 | (2006.01) |
| A23G 1/48 | (2006.01) |
| A23G 1/40 | (2006.01) |
| A23C 9/156 | (2006.01) |
| A23G 1/32 | (2006.01) |
| A23G 3/36 | (2006.01) |
| A23G 3/42 | (2006.01) |
| A23G 3/48 | (2006.01) |
| A23G 4/06 | (2006.01) |
| A23G 4/10 | (2006.01) |
| A23G 9/32 | (2006.01) |
| A23C 9/13 | (2006.01) |
| A23C 11/10 | (2006.01) |
| A23C 13/12 | (2006.01) |
| A23C 17/00 | (2006.01) |
| A23C 19/09 | (2006.01) |
| A23L 33/125 | (2016.01) |

(56) References Cited

U.S. PATENT DOCUMENTS

| | | | |
|---|---|---|---|
| 3,653,923 | A | 4/1972 | Ishii et al. |
| 3,739,064 | A | 6/1973 | Rizzi |
| 3,821,417 | A | 6/1974 | Westall et al. |
| 3,857,962 | A | 12/1974 | Westall et al. |
| 3,934,047 | A | 1/1976 | Schade |
| 3,984,394 | A | 10/1976 | Westall et al. |
| 4,154,862 | A | 5/1979 | Guadagni et al. |
| 6,165,516 | A | 12/2000 | Gudas et al. |
| 6,761,920 | B1 * | 7/2004 | Kaplan ............... A23C 3/033 426/399 |
| 7,815,956 | B2 | 10/2010 | Lee et al. |
| 2002/0188019 | A1 | 12/2002 | Ley et al. |
| 2007/0116821 | A1 | 5/2007 | Prakash et al. |
| 2007/0116825 | A1 | 5/2007 | Prakash et al. |
| 2007/0116834 | A1 | 5/2007 | Prakash et al. |
| 2008/0107775 | A1 | 5/2008 | Prakash et al. |
| 2010/0178389 | A1 | 7/2010 | Jia et al. |
| 2014/0242255 | A1 | 8/2014 | Jia et al. |
| 2015/0313265 | A1 | 11/2015 | Jia et al. |
| 2018/0235259 | A1 | 8/2018 | Jia et al. |

FOREIGN PATENT DOCUMENTS

| | | |
|---|---|---|
| GB | 1428945 | 3/1976 |
| WO | 2007061898 A1 | 5/2007 |
| WO | 2007061908 A1 | 5/2007 |
| WO | 2008148239 A1 | 12/2008 |

OTHER PUBLICATIONS

Friedman, et al. "Distribution of Catechins, Theaflavins, Caffeine, and Theobromine in 77 Teas Consumed in the Untied States" Journal of Food Science, vol. 70, No. 9, pp. 550-559, 2005.
Van Gorsel, et al. "Compositional Characterization of Prune Juice" J. Agric. Food Chem. vol. 40, No. 5, pp. 784-789, 1992.
Guadagni, et al. "Effect of Subthreshold Concentrations of Limonin, Naringin and Sweetners on Bitterness Perception" Journal of the Science of Food and Agriculture, vol. 25, Issue 11, pp. 1349-1354, Nov. 1974.
Guadagni, et al. "Some Factors Affecting Sensory Thresholds and Relative Bitterness of Limonin and Naringin" Journal of the Science of Food and Agriculture, vol. 25, pp. 1199-2005, Oct. 1974.
"Masking the Bitter Taste of Pharmaceuticals" Manufacturing Chemist, vol. 71, Issue 7, pp. 16-17, Jul. 2000.
Petkovsek, et al. Patameters of Inner Quality of the Apple Scab Resistant and Susceptible Apple Cultivars (Malus lomestica Borkh.), Scientia Horticulturae, vol. 114, Issue 1, pp. 37-44, Aug. 18, 2007.
Qin, et al. "A New Sweet Dihydrochalcone-Glucoside from Leaves of Lithocarpus pachyphyllus (Kurz) Rehd. (Fagaceae)" Verlag der Zeitschrift Fuer Naturforschung, Tuebingen, vol. 58c, pp. 759-761, 2003.
Non Final Office Action dated Jun. 27, 2018 U.S. Appl. No. 15/958,612.
Non Final Office Action dated Sep. 23, 2015 U.S. Appl. No. 14/799,003.
Final Office Action dated Jul. 14, 2016 U.S. Appl. No. 14/799,003.
Non Final Office Action dated Mar. 21, 2017 U.S. Appl. No. 14/799,003.
Final Office Action dated Nov. 28, 2017 U.S. Appl. No. 14/799,003.
Non Final Office Action dated Jul. 16, 2014 U.S. Appl. No. 14/269,803.
Final Office Action dated Jan. 15, 2015 U.S. Appl. No. 14/269,803.
Non Final Office Action dated Jan. 31, 2012 U.S. Appl. No. 12/663,321.
Final Office Action dated Dec. 18, 2012 U.S. Appl. No. 12/663,321.
Non Final Office Action dated Nov. 5, 2013 U.S. Appl. No. 12/663,321.
International Preliminary Report on Patentability PCT/CH2008/000253 dated Dec. 11, 2009.
International Search Report PCT/CH2008/000253 dated Sep. 29, 2008.
International Written Opinion PCT/CH2008/000253 dated Sep. 29, 2008.
N. Artkin, et al. "HPLC Determination of Phenolic Compound and Procyanidin Content of Turkish Apple Juice Concentrate" J. Journal, vol. 22, No. 5. 327-335, 1998.
T.E. Furia (Editor), "CRC Handbook of Food Additives", CRC Press, vol. 2, 1980. XP-002495728.
IGOE, Dictionary of Food Ingredients, 3rd Edition, 1996.
IGOE, Dictionary of Food Ingredients, 5th Edition, p. 190, Jun. 2011.

* cited by examiner

CONSUMABLES

CROSS REFERENCE TO RELATED APPLICATIONS

This is a continuation application of U.S. Ser. No. 15/958,612 filed on Apr. 20, 2018, which is a continuation application of U.S. Ser. No. 14/799,003 filed on Jul. 14, 2015, now abandoned, which is a continuation application of U.S. Ser. No. 14/269,803, filed on May 5, 2014, now abandoned, which is a continuation application of U.S. Ser. No. 12/663,321, filed on Mar. 6, 2010, now abandoned, which is a national stage application filed under 35 USC 371 of International Application No. PCT/CH2008/000253, filed on Jun. 6, 2008, which applications claim priority to U.S. Provisional Application For Patent Ser. No. 61/055,584, filed May 23, 2008, and to U.S. Provisional Application For Patent Ser. No. 60/942,736, filed Jun. 8, 2007. The applicant herein incorporates by reference the entirety of each of the foregoing documents herein, and claims all available priority benefit to each of the above applications.

TECHNICAL FIELD

Disclosed are sweetened consumables and methods of forming said sweetened consumables that comprise certain sweeteners and a compound of formula (1) (including trilobatin and HDG) in a concentration near its sweetness detection threshold to enhance the sweetness.

BACKGROUND

Trilobatin is a natural dihydrochalcone type sweetener that occurs in the Chinese sweet tea plant *Lithocarpus polystachyus*, the leaves of which have been consumed as sweet tea in the south of China for centuries. It has also been found in the apple species *Malus trilobata*, and from this source the name trilobatin was derived. Trilobatin was first chemically synthesized in 1942 under the name p-phlorizin. Under the name prunin dihydrochalcone, U.S. Pat. No. 3,087,821 described its use as a sweetener in 1963.

Trilobatin has been used as a sweetener in concentrations well above its sweetness detection level.

Hesperetin dihydrochalcone 4"-beta-D-glucoside (HDG) is a known sweetener that can be synthesized from hesperidin, which is present in peels/fruit of *Citrus sinensis* L. (Rutaceae), commonly known as sweet orange and *C. reticulata*, commonly known as tangerine or mandarin. The synthesis of HDG may be performed by reduction of hesperidin in dilute alkali which yields hesperidin dihydrochalcone, followed by partial hydrolysis, either by acid or by a dissolved or immobilized enzyme, to form HDG, for example as described in U.S. Pat. No. 3,429,873.

Again HDG is used in concentrations well above its sweetness detection level.

Applicant surprisingly found that compounds of formula (1) (trilobatin and HDG) are sweetness enhancers and can be used in a low concentration near their sweetness detection threshold in combination with certain sweeteners, including the sugars sucrose, fructose, glucose, high fructose corn syrup (containing fructose and glucose), xylose, arabinose, and rhamnose, the sugar alcohols erythritol, xylitol, mannitol, sorbitol, and inositol, and the artificial sweeteners AceK, aspartame, neotame, sucralose, and saccharine, to enhance the sweetness of said sweeteners.

SUMMARY

Provided are the following:
(1) A sweetened consumable comprising
a) at least 0.0001% (w/w) of at least one sweetener, including natural and artificial sweeteners, wherein said sweetener includes sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof, wherein said at least one sweetener or sweetener combination is present in a concentration above the sweetness detection threshold in a concentration at least isosweet to 2% sucrose, and b) a compound of formula (1),

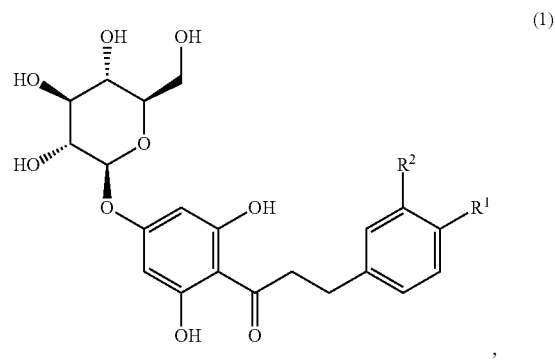

wherein $R^1$ is selected from the group consisting of OH and $OCH_3$, and $R^2$ is selected from the group consisting of H and OH, $R^1$ and $R^2$ comprise at least one OH group, and when $R^1$ is OH then $R^2$ is H (trilobatin), and when $R^1$ is $OCH_3$ then $R^2$ is OH (HDG), wherein the compound of formula (1) is present in a concentration near its sweetness detection threshold, and wherein the trilobatin concentration in consumables is from 3 to 200 ppm, and in consumables that are dairy products, dairy-derived products and dairy-alternative products is from 10 ppm to 750 ppm, and wherein the HDG concentration in consumables is from 0.3 to 20 ppm, and in consumables that are dairy products, dairy-derived products and dairy-alternative products, is from 1 ppm to 75 ppm.

Trilobatin or HDG are used in a concentration near their respective sweetness thresholds which may vary in different consumables as described herein.

Alternatively, trilobatin may be present in a concentration from 3 to 150 or from 3 to 100 ppm in the consumable, or from 10 ppm to 750 ppm, 10 ppm to 700 ppm, 10 ppm to 650 ppm, 10 ppm to 600 ppm, 10 ppm to 550 ppm, or 10 to 500 ppm when used in consumables that are dairy products, dairy-derived products or dairy-alternative products.

Alternatively, in a consumable which has a pH below 6.5, the trilobatin concentration may be from 6 to 300 ppm; in a consumable which has a pH below 5 or below 4, the trilobatin concentration may be from 6 to 400 ppm.

Alternatively, HDG may be present in a concentration from 0.3 to 15 or from 0.3 to 10 ppm in the consumable, or from 1 ppm to 75 ppm, 1 ppm to 70 ppm, 1 ppm to 65 ppm, 1 ppm to 60 ppm, 1 ppm to 55 ppm, or 1 to 50 ppm when used in consumables that are dairy products, dairy-derived products or dairy-alternative products.

Alternatively, in a consumable which has a pH below 6.5, the HDG concentration may be from 0.6 to 30 ppm; in a consumable which has a pH below 5, or below 4, the HDG concentration may be from 0.6 to 40 ppm.

(2) The sweetened consumable of item 1 wherein the compound of formula (1) is trilobatin.

(3) The sweetened consumable of item 1 wherein the compound of formula (1) is hesperitin dihydrochalcone 4"-beta-D-glucoside (HDG).

(4) A sweetened consumable as herein described including in items (1)-(3) that is a water-based consumable including but not limited to beverage, water, aqueous beverage, enhanced/slightly sweetened water drink, mineral water, carbonated beverage, non-carbonated beverage, carbonated water, still water, soft drink, non-alcoholic drink, alcoholic drink, beer, wine, liquor, fruit drink, juice, fruit juice, vegetable juice, broth drink, coffee, tea, black tea, green tea, oolong tea, herbal tea, cocoa (water-based), tea-based drink, coffee-based drinks, cocoa-based drink, syrup, frozen fruit, frozen fruit juice, water-based ice, fruit ice, sorbet, dressing, salad dressing, sauce, soup, and beverage botanical materials (whole or ground), or instant powder for reconstitution (coffee beans, ground coffee, instant coffee, cocoa beans, cocoa powder, instant cocoa, tea leaves, instant tea powder).

(5) A sweetened consumable as herein described including in items (1) to (3) that is a solid dry consumable including but not limited to cereals, baked food products, biscuits, bread, breakfast cereal, cereal bar, energy bars/nutritional bars, granola, cakes, cookies, crackers, donuts, muffins, pastries, confectioneries, chewing gum, chocolate, fondant, hard candy, marshmallow, pressed tablets, snack foods, botanical materials (whole or ground), and instant powders for reconstitution.

(6) A sweetened consumable as herein described including in items (1) to (3) which is a dairy product, dairy-derived product or dairy-alternative product as herein described, including but not limited to milk, fluid milk, cultured milk product, cultured and noncultured dairy-based drink, cultured milk product cultured with lactobacillus, yoghurt, yoghurt-based beverage, smoothy, lassi, milk shake, acidified milk, acidified milk beverage, butter milk, kefir, milk-based beverages, milk/juice blend, fermented milk beverage, icecream, dessert, sour cream, dip, salad dressing, cottage cheese, frozen yoghurt, soy milk, rice milk, soy drink, and rice milk drink.

(7) A sweetened consumable as herein described including any one of items (1) to (6) comprising at least one further sweetness enhancer selected from the group consisting of naringin dihydrochalcone, mogroside V, swingle extract, rubusoside, rubus extract, stevioside, rebaudioside A, and NHDC, or combinations thereof, wherein each further sweetness enhancer is present in a concentration near its sweetness detection threshold, which is for naringin dihydrochalcone from 2 to 60 ppm, for rubusoside from 1.4 ppm to 56 ppm, for rubus extract from 2 ppm to 80 ppm, for mogroside V from 0.4 ppm to 12.5 ppm, for swingle extract from 2 to 60 ppm, for stevioside from 2 to 60 ppm, for rebaudioside A from 1 to 30 ppm, and for NHDC from 1 to 5 ppm.

(8) A sweetened consumable as herein described, including in item (7), comprising 2 to 60 ppm naringin dihydrochalcone.

(9) A sweetened consumable as herein described, including in item (7), comprising 1.4 ppm to 56 ppm rubusoside or 2 ppm to 80 ppm rubus extract.

(10) A sweetened consumable as herein described, including in item (7), comprising 0.4 ppm to 12.5 ppm mogroside V or 2 to 60 ppm swingle extract.

(11) A sweetened consumable as herein described, including in item (7), comprising 1 to 30 ppm rebaudioside A.

(12) A sweetened consumable as herein described, including in item (7), comprising 2 to 60 ppm stevioside.

(13) A sweetened consumable as herein described, including in item (7), comprising 1 to 5 ppm neohesperidin dihydrochalcone.

(14) A sweetened consumable as herein described, including in item (7), comprising two of the further sweetness enhancers selected from the group consisting of naringin dihydrochalcone, mogroside V, swingle extract, rubusoside, rubus extract, stevioside, rebaudioside A, and neohesperidin dihydrochalcone.

(15) A sweetened consumable as herein described, including in item (14), wherein one of the further sweetness enhancers is selected from the group consisting of mogroside V, swingle extract, rubusoside, rubus extract, stevioside, rebaudioside A, and the other further sweetness enhancer is selected from the group consisting of neohesperidin dihydrochalcone and naringin dihydrochalcone.

(16) A sweetened consumable as herein described, which is a beverage.

(17) A beverage as herein described, including in item (16), additionally comprising neohesperidin dihydrochalcone in a concentration from 1 to 2 ppm.

(18) A method of sweetening consumables wherein:
a) at least 0.0001% of at least one sweetener, including natural and artificial sweeteners,
  wherein said sweetener includes sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof,
  wherein said at least one sweetener or sweetener combination is present in a concentration above the sweetness detection threshold in a concentration at least isosweet to 2% sucrose, and
b) a compound of formula (I)

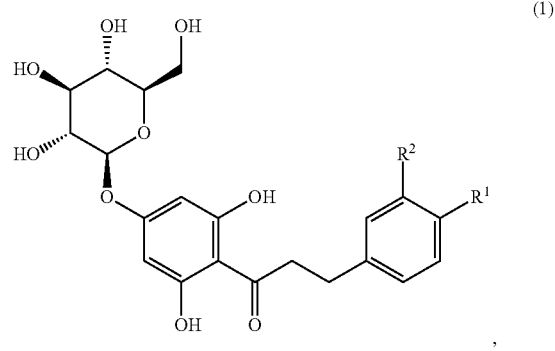

wherein $R^1$ is selected from the group consisting of OH and $OCH_3$, and $R^2$ is selected from the group consisting of H and OH, $R^1$ and $R^2$ comprise at least one OH group, and when $R^1$ is OH then $R^2$ is H (trilobatin), and when $R^1$ is $OCH_3$ then $R^2$ is OH (HDG),
wherein the compound of formula (1) is present in a concentration near its sweetness detection threshold, and
wherein for trilobatin said concentration in consumables is from 3 to 200 ppm, and in consumables that are dairy products, dairy-derived products and dairy-alternative products is from 10 ppm to 750 ppm, and wherein for HDG said concentration in consumables is from 0.3 to 20 ppm, and in consumables that are dairy products, dairy-derived products and dairy-alternative products is from 1 ppm to 75 ppm, are admixed to a consumable.

Alternatively, trilobatin may be present in a concentration from 3 to 150 or from 3 to 100 ppm in the consumable, or from 10 ppm to 750 ppm, 10 ppm to 700 ppm, 10 ppm to 650 ppm, 10 ppm to 600 ppm, 10 ppm to 550 ppm, or 10 to 500 ppm when used in consumables that are dairy products, dairy-derived products or dairy-alternative products.

Alternatively, in a consumable which has a pH below 6.5, trilobatin may be present in a concentration from 6 to 300 ppm; in a consumable which has a pH below 5, or below 4, trilobatin may be present in a concentration from 6 to 400 ppm.

Alternatively, HDG may be present in a concentration from 0.3 to 15 or from 0.3 to 10 ppm in the consumable, or from 1 ppm to 75 ppm, 1 ppm to 70 ppm, 1 ppm to 65 ppm, 1 ppm to 60 ppm, 1 ppm to 55 ppm, or 1 to 50 ppm when used in consumables that are dairy products, dairy-derived products or dairy-alternative products.

Alternatively, in a consumable which has a pH below 6.5, the HDG may be present in a concentration from 0.6 to 30 ppm; in a consumable which has a pH below 5, or below 4, the HDG may be present in a concentration from 0.6 to 40 ppm.

(19) A method as herein described, including in item (18), further comprising the admixture of at least one enhancer selected from the group consisting of naringin dihydrochalcone, mogroside V, swingle extract, rubusoside, rubus extract, stevioside, rebaudioside A, and NHDC, wherein each enhancer is present in a concentration near its sweetness detection threshold, which is for naringin dihydrochalcone from 2 to 60 ppm, for rubusoside from 1.4 ppm to 56 ppm, for rubus extract from 2 ppm to 80 ppm, for mogroside V from 0.4 ppm to 12.5 ppm, for swingle extract from 2 to 60 ppm, for stevioside from 2 to 60 ppm, for rebaudioside A from 1 to 30 ppm, and for NHDC from 1 to 5 ppm.

Consumables and methods herein described, including in any one of items (1) to (19), may contain a compound of formula (1) from any source, it may be chemically synthesized or extracted from any source including a botanical source.

For trilobatin, said botanical source includes but is not limited to parts or leaves of *Lithocarpus polystachyus* (Chinese sweet tea) and parts or leaves of an apple species, said apple species including *Malus trilobata*.

HDG may be synthesized or derived from reaction of its precursor hesperidin, which may be synthesized or extracted from any source including a botanical source. Said botanical source includes the peels and fruit of *Citrus sinensis* L. (Rutaceae), commonly known as sweet orange, and *C. reticulata*, commonly known as tangerine or mandarin.

DETAILED DESCRIPTION

Trilobatin or 1-[4-(beta-D-glucopyranosyloxy)-2,6-dihydroxyphenyl]-3-(4-hydroxyphenyl)-1-propanone is also known as p-Phlorizin, Phloretin 4'-glucoside, Phloretine-4'-glucoside, Prunin dihydrochalcone, or p-Phloridzin. Its chemical structure is given below.

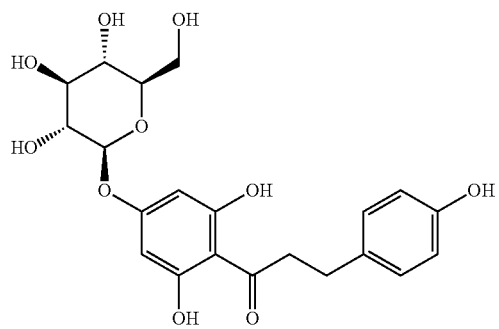 [SMILES: O=C(CCc1ccc(O)cc1)c1c(O)cc(O[C@@H]2O[C@H](CO)[C@@H](O)[C@H](O)[C@H]2O)cc1O]

HDG or hesperitin dihydrochalcone 4"-beta-D-glucoside is also known as 1-[4-(–D-glucopyranosyloxy)-2,6-dihydroxyphenyl]-3-(3-hydroxy-4-methoxyphenyl)-1-propanone. The chemical structure of HDG is given below.

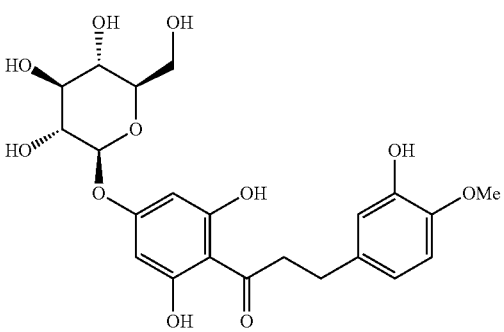 [SMILES: COc1ccc(CCC(=O)c2c(O)cc(O[C@@H]3O[C@H](CO)[C@@H](O)[C@H](O)[C@H]3O)cc2O)cc1O]

The sweetness detection threshold for trilobatin, HDG and optional enhancers were determined by the applicant.

The sweetness detection threshold varies somewhat in different individuals. For example, some individuals are able to detect the sweetness of sucrose in a very low concentration of 0.4%, others need at least 0.7%, or at least 1% or even more. All examples were performed with sweet sensitive panelists able to detect at least 0.5% of sucrose or less. The concentration detectable by the average consumer will therefore be higher.

A concentration near a sweetness enhancer's sweetness detection threshold is defined herein as a concentration with an isointensity to sucrose of up to 1% sucrose or lower, for example, up to 0.8%, up to 0.75%, up to 0.7%, or up to 0.5% sucrose, as detected by sweet sensitive panelists.

An example of a useful concentration of trilobatin near its sweetness detection threshold is 3 to 200 ppm, or 3 to 150 ppm, or 3 to 100 ppm in consumables.

Further examples, without limitation, are trilobatin concentrations from 10 ppm to 750 ppm in consumables that are dairy products, dairy-derived products or dairy-alternative products, or concentrations from 6 to 300 ppm in consumables with a pH below 6.5, or concentrations from 6 to 400 ppm in consumables with a pH below 5, or below 4.

An example of a useful concentration of HDG near its sweetness detection threshold is 0.3 to 20 ppm, or 0.3 to 15 ppm, or 0.3 to 10 ppm in consumables.

Further examples, without limitation, are HDG concentrations from 1 ppm to 75 ppm in consumables that are dairy products, dairy-derived products or dairy-alternative products, or concentrations from 0.6 to 30 ppm in consumables with a pH below 6.5, or concentrations from 0.6 to 40 ppm in consumables with a pH below 5, or below 4.

A compound of formula (1) (trilobatin, HDG, or a mixture thereof) can be used in various consumables including but not limited to water-based consumables, solid dry consumables and dairy products, dairy-derived products and dairy-alternative products.

Water-based consumables include but are not limited to beverage, water, aqueous drink, enhanced/slightly sweetened water drink, mineral water, carbonated beverage, non-carbonated beverage, carbonated water, still water, soft drink, non-alcoholic drink, alcoholic drink, beer, wine, liquor, fruit drink, juice, fruit juice, vegetable juice, broth drink, coffee, tea, black tea, green tea, oolong tea, herbal tea, cocoa (water-based), tea-based drink, coffee-based drink, cocoa-based drink, syrup, frozen fruit, frozen fruit juice, water-based ice, fruit ice, sorbet, dressing, salad dressing, sauce, soup, and beverage botanical materials (whole or ground), or instant powder for reconstitution (coffee beans, ground coffee, instant coffee, cocoa beans, cocoa powder, instant cocoa, tea leaves, instant tea powder).

Solid dry consumables include but are not limited to cereals, baked food products, biscuits, bread, breakfast cereal, cereal bar, energy bars/nutritional bars, granola, cakes, cookies, crackers, donuts, muffins, pastries, confectioneries, chewing gum, chocolate, fondant, hard candy, marshmallow, pressed tablets, snack foods, and botanical materials (whole or ground), and instant powders for reconstitution as mentioned above.

In certain products the sweetness detection threshold will be higher, for example in dairy products, dairy-derived products and dairy-alternative products. Dairy-derived food products contain milk or milk protein. Dairy-alternative products contain (instead of dairy protein derived from the milk of mammals) protein from botanical sources (soy, rice, etc.).

Dairy products, dairy-derived products and dairy-alternative products include but are not limited to milk, fluid milk, cultured milk product, cultured and noncultured dairy-based drinks, cultured milk product cultured with lactobacillus, yoghurt, yoghurt-based beverage, smoothy, lassi, milk shake, acidified milk, acidified milk beverage, butter milk, kefir, milk-based beverage, milk/juice blend, fermented milk beverage, icecream, dessert, sour cream, dip, salad dressings, cottage cheese, frozen yoghurt, soy milk, rice milk, soy drink, rice milk drink.

Milk includes, but is not limited to, whole milk, skim milk, condensed milk, evaporated milk, reduced fat milk, low fat milk, nonfat milk, and milk solids (which may be fat or nonfat).

For dairy products, dairy-derived products and dairy-alternative products, a useful concentration near the sweetness detection threshold of trilobatin will be from about 10 to 500 ppm or higher, and may be up to 550 ppm, 600 ppm, 650 ppm, 700 ppm, or 750 ppm; a useful concentration near the sweetness detection threshold of HDG will be from about 1 to 50 ppm or higher, and may be up to 55 ppm, 60 ppm, 65 ppm, 70 ppm, or 75 ppm.

The isointensity of various trilobatin concentrations was determined in water, and 100 ppm trilobatin was isosweet to 0.5% sucrose and 200 ppm was isosweet to 1.0% sucrose.

Similarly, the isointensity of various HDG concentrations was determined in water, and 10 ppm HDG was isosweet to 0.5% sucrose, 15 ppm HDG was isosweet to about 0.75% sucrose and 20 ppm was isosweet to 1.0% sucrose.

A compound of formula (1) (trilobatin, HDG, or a mixture thereof) may be combined with optional enhancers in a low concentration near their sweetness detection threshold for an improved sweetness enhancing effect. These optional enhancers and some of their synonyms and plant sources are discussed in more detail below.

The one or more optional enhancers include, without limitation, naringin dihydrochalcone, rubus extract, rubusoside, swingle extract, mogroside V, rebaudioside A, stevioside, and neohesperidin dihydrochalcone (NHDC).

Useful concentrations for these optional enhancers are indicated below.

2 to 60 ppm naringin dihydrochalcone
1.4 to 42 rubusoside or 2 to 60 ppm rubus extract.
0.4 to 12.5 ppm mogroside V or 2 ppm to 60 ppm swingle extract.
1 to 30 ppm rebaudioside A.
2 to 100 ppm, for example, 2 to 60 ppm or 2 to 100 ppm, stevioside.
1 to 5 ppm NHDC.

Further useful concentrations for rubus extract may be, for example, from 2 ppm to up to 80 ppm. Further useful concentrations for rubusoside may be from 2 ppm to up to 56 ppm.

The determined isointensities to sucrose solutions of the optional enhancers are indicated below.

45 ppm naringin dihydrochalcone is isosweet to 0.5% sucrose.
60 ppm naringin dihydrochalcone is isosweet to 1.25% sucrose.
60 ppm rubus extract with 42 ppm rubusoside is below the intensity of 1% sucrose.
60 ppm swingle extract with 12.48 ppm mogroside V is isosweet to 0.75% sucrose.
20 ppm rebaudioside A is isosweet to 0.75% sucrose.
30 ppm stevioside is isosweet to 0.5% sucrose.
40 ppm stevioside is isosweet to 0.75% sucrose.
2 ppm NHDC is isosweet to 0.5% sucrose.

Naringin dihydrochalcone (NarDHC) is also known as 1-[4-[[2-O-(6-Deoxy-alpha-L-mannopyranosyl)-beta-D-glucopyranosyl]oxy]-2,6-dihydroxyphenyl]-3-(4-hydroxyphenyl)-1-propanone.

*Rubus* extract is the extract of the plant *Rubus suavissimus* and contains rubusoside. Rubusoside may be purified from the extract and used in purified form or the extract may be used. Alternatively to *Rubus suavissimus* extract, another botanical extract containing a sufficient amount of rubusoside may be used.

Swingle extract is also known as swingle, Lo Han, or Lo Han Guo. Swingle extract contains mogrosides and can be extracted from the plant *Siraitia grosvenorii*. *Siraitia grosvenorii* (syn. *Momordica grosvenorii, Thiadiantha grosvenorii*); also called arhat fruit or longevity fruit; or in simplified Chinese luó hàn guǒ or luo han kuo. The plant contains mogrosides, a group of triterpene glycosides that make up approximately 1% of the flesh of the fresh fruit. Through extraction an extract in form of a powder containing 80% mogrosides can be obtained. Mogroside extract contains mogroside V (major active), mogroside IIa, mogroside IIb, mogroside III, mogroside IV, 11-oxo mogroside V, and siamenoside I.

Alternatively to swingle extract, another botanical extract containing a sufficient amount of mogroside V may be used.

Rebaudioside A is a terpenoid glycoside that is found in extract of *Stevia rebaudiana*.

Stevioside is a terpenoid glycoside also known as stevia, and is found in extracts of the plant *Stevia rebaudiana*.

Neohesperidin dihydrochalcone (NHDC, E959) is known to act synergistically with sucrose and/or stevioside, though its effectiveness at its sweetness detection threshold for sucrose is disputed. For example, Kroeze et al., Chem.

Senses 2000, 25, 555-559 disclose that NHDC does not enhance sucrose sweetness at its sweetness detection threshold.

The sweeteners include, but are not limited to, the sugars sucrose, fructose, glucose, high fructose corn syrup (containing fructose and glucose), xylose, arabinose, and rhamnose, the sugar alcohols erythritol, xylitol, mannitol, sorbitol, and inositol, and the artificial sweeteners AceK, aspartame, neotame, sucralose, and saccharine, and combinations of these sweeteners.

Sucrose, also known as table sugar or saccharose, is a disaccharide of glucose and fructose. Its systematic name is alpha-D-glucopyranosyl-(1→2)-beta-D-fructofuranose.

Fructose and glucose are monosaccharide sugars.

High fructose corn syrup (HFCS) consists of a mixture of glucose and fructose. Like ordinary corn syrup, the high fructose variety is made from corn starch using enzymes. The fructose content of corn syrup (glucose) is increased through enzymatic processing. Common commercial grades of high fructose corn syrup include fructose contents of 42%, 55%, or 90%. The 55% grade is most commonly used in soft drinks.

Erythritol (systematic name 1,2,3,4-butanetetrol) is a natural non-caloric sugar alcohol.

AceK, aspartame, neotame and sucralose are artificial sweeteners.

Acesulfam potassium (AceK) is the potassium salt of 6-methyl-1,2,3-oxathiazine-4(3H)-one 2,2-dioxide, an N-sulfonylamide. It is also known as Acesulfam K or AceK, or under various trademark names including Sunett® and Sweet One®. In the European Union it is also known under the E number (additive code) E950.

Aspartame is the name for aspartyl-phenylalanine-1-methyl ester, a dipeptide. It is known under various trademark names including Equal®, and Canderel®. In the European Union, it is also known under the E number (additive code) E951.

Sucralose is the name for 1,6-dichloro-1,6-dideoxy-β-D-fructo-furanosyl 4-chloro-4-deoxy-α-D-galactopyranoside, which is a chlorodeoxysugar. It is also known by the trade name Splenda®. In the European Union, it is also known under the E number (additive code) E955.

The natural sweeteners may be used in pure or partly purified form, and may be chemically synthesized, produced by biotechnological processes including fermentation, or isolated from a natural source, in particular a botanical source (including, without limitation, fruits, sugar cane, sugar beet), for example a plant extract or syrup including, without limitation, corn syrup, high fructose corn syrup, honey, molasses, maple syrup, fruit concentrates, and other syrups and extracts.

Sweeteners, compounds of formula (1) (trilobatin, HDG, and mixtures thereof) and the optional enhancers can be used in purified or isolated form or in the form of a botanical extract comprising the sweetness enhancing actives. For example, trilobatin can be chemically synthesized or from a botanical source including but not limited to *Lithocarpus polystachus* and *Malus* spp; and HDG can be synthesized or isolated from a natural source, or used in semi-natural form synthesized from hesperidin extracted from a botanical source as is well known in the art and described hereinabove.

Compounds of formula (1) (trilobatin, HDG, and mixtures thereof) can be used alone or in combination with one or more optional enhancers as described herein, in a concentration as indicated below in a composition containing 0.0001 to 15% (wt/wt) or more of at least one sweetener. A useful concentration for a sweetener is a concentration that on its own provides an isointensity to a sucrose solution of at least 2%, for example 2% to 15%, or 5% to 12%.

For example, a useful concentration of sucrose, fructose, glucose, high fructose corn syrup (HFCS) or erythritol may be from about 5% to about 12%.

Compounds of formula (1) (trilobatin, HDG, and mixtures thereof) and the optional enhancers can be added to consumables to enhance the sweetness of sweeteners herein described present in said consumables or added to such consumables.

Consumables include all food products, including but not limited to, cereal products, rice products, tapioca products, sago products, baker's products, biscuit products, pastry products, bread products, confectionery products, desert products, gums, chewing gums, chocolates, ices, honey products, treacle products, yeast products, baking-powder, salt and spice products, savory products, mustard products, vinegar products, sauces (condiments), tobacco products, cigars, cigarettes, processed foods, cooked fruits and vegetable products, meat and meat products, jellies, jams, fruit sauces, egg products, milk and dairy products, yoghurts, cheese products, butter and butter substitute products, milk substitute products, soy products, edible oils and fat products, medicaments, beverages, carbonated beverages, alcoholic drinks, beers, soft drinks, mineral and aerated waters and other non-alcoholic drinks, fruit drinks, fruit juices, coffee, artificial coffee, tea, cocoa, including forms requiring reconstitution, food extracts, plant extracts, meat extracts, condiments, sweeteners, nutraceuticals, gelatins, pharmaceutical and non-pharmaceutical gums, tablets, lozenges, drops, emulsions, elixirs, syrups and other preparations for making beverages, and combinations thereof.

Consumables may contain acids to provide a low pH. For example, many beverages have a low pH, for example, from pH 2.6 to 3. Trilobatin and trilobatin compositions comprising optional enhancers described herein also work under low pH conditions and show an enhancement effect.

However, a lower pH will decrease sweet sensitivity as is well known in the art, accordingly the sweetness threshold for both sweetener and sweetness enhancer will be higher.

The sweetness threshold for consumables of low pH, for example, pH 6.5 or lower, will be higher accordingly and more sweetener and/or sweetness enhancer will be used to reach a similar sweetening/enhancement effect. A useful concentration range for trilobatin in consumables of pH 6.5 or lower may be from 6 to 300 ppm; for HDG it may be from 0.6 to 30 ppm. In consumables below pH 5, or below pH 4, for example pH 2.6 to pH 3, including, without limitation, beverages, the concentration range may be even higher, for example up to 400 ppm for trilobatin and up to 40 ppm for HDG, respectively.

How to sweeten consumables using sweeteners hereindescribed in a sufficient amount is well-known in the art. Depending on the consumable, the amount of sweetener can be reduced by addition of trilobatin and optional enhancers described herein. For example, for sucrose as sweetener, a reduction of about 1 to 4° Brix or more can be achieved.

Consumbles may contain any amount of a sweetener as herein-described, a useful range is, for example, at least 2%, for example about 2% to 15%, or about 5% to 12% of one or more selected from sucrose, fructose, glucose, high fructose corn syrup, or erythritol.

A useful range for artificial sweeteners is in a concentration isosweet to about 2 to 15% sucrose.

Different sweeteners may be used in combination in a concentration equivalent to at least 2% isointensity to sucrose.

For example, carbonated beverages usually contain about 10% to 12% high fructose corn syrup and/or sucrose.

An additional effect of the trilobatin and HDG enhanced sweetness in consumables that are fruits or that contain fruits or part of fruits or fruit flavors is a higher fruit flavor impact. In particular, berry notes, green notes, and cinnamon notes are enhanced and have a higher flavor impact.

Such enhanced fruits or fruit flavors may comprise citrus fruits including lemon, lime, orange, clementine, tangerine, tangelo, kumquat, satsuma, minneola, grapefruit, pummelo, sweety, ugli, carambola, apricot, banana, grape, watermelon, cantaloupe, passion fruit, papaya, persimmon, pomegranate, guave, lychee, apple, pear, peach, pineapple, kiwi, mango, nectarine, plum, fig, and berries.

The fruit flavor enhancement is particularly noticeable in berry fruit or flavors, for example, without limitation, strawberry, raspberry, bramble fruits including blackberry, bayberry, gooseberry, and blueberry.

EXAMPLES

All concentrations in % are % (wt/wt), unless otherwise indicated. All examples were performed with sweet sensitive panelists able to detect at least 0.5% of sucrose or less, unless stated otherwise. The concentration detectable by the average consumer will be higher.

Example 1

Determination of the Sweetness Detection Threshold of Trilobatin and HDG

The sweetness detection threshold was determined as detailed in 1a, 1b and 1c for trilobatin, and in 1d for HDG.

1a. Paired Comparison of 20-100 ppm Trilobatin Versus 0-1% Sucrose

Trilobatin (20 ppm, 60 ppm, 100 ppm) in water samples were evaluated for isointensity to sucrose solutions in a concentration of 0, 0.5 and 1% sucrose using a paired comparison method. Samples were paired and tasted left to right with rinsing (water) in between, by one panelist trained for sweetness detection. Once completing the sequence, the panelist ranked the pair of samples for sweetness then evaluated samples with respect to one another with the following descriptors (in ascending order): "significantly less sweet", "less sweet", "notably less sweet", "isosweet", "weakly sweeter", "sweeter", "notably sweeter", "significantly sweeter".

The trilobatin samples were compared to either 0%, 0.5%, or 1% sucrose solutions. The results are indicated in the table below.

| Trilobatin [ppm] | Taste of trilobatin samples compared to sucrose | Sucrose [% wt/wt] |
| --- | --- | --- |
| 20 | isosweet | 0 |
| 20 | notably less sweet | 0.5 |
| 60 | weakly sweeter | 0 |
| 60 | less sweet | 0.5 |
| 100 | sweeter | 0 |
| 100 | isosweet | 0.5 |
| 100 | less sweet | 1 |

The 20 ppm solution of trilobatin had no detectable difference from 0% sucrose and was notably less sweet than 0.5% sucrose. The 60 ppm trilobatin sample was weakly sweeter than 0% sucrose and but was found to be less sweet than 0.5% sucrose, which is barely detectably sweet. Accordingly, the 60 ppm trilobatin sample was isosweet to 0.25% sucrose, or below the sweetness detection threshold, by interpolation. The 100 ppm trilobatin sample was sweeter than 0% sucrose and isosweet to 0.5% sucrose, which is weakly sweet.

1 b. Isointensity of 100 ppm Trilobatin

The sensory evaluation was conducted using a ranking method. Samples at ambient temperature were randomly presented in 15 ml blind aliquots (unidentifiable by panelists). Panels consisted of 15 sweet sensitive subjects and samples were presented in 2 replications over 1 session. After tasting each sample, the mouth was rinsed thoroughly with water at ambient temperature prior to tasting the next sample. Panelists were presented with 0.5%, 1%, 1.5% and 2% sucrose solutions in water and a fifth sample of 100 ppm trilobatin in water. Subjects were asked to rank the samples from low to high with respect to perceived sweet taste. R-indices were calculated for 100 ppm trilobatin versus either 0.5%, 1%, 1.5% or 2% sucrose.

An R-index greater than the higher critical value means that the sweetness enhancer sample was significantly sweeter than the sucrose sample. An R-index from 50% to the upper critical value would mean that the sweetness enhancer sample had an equivalent sweetness to the compared sucrose sample. An R-index below the lower critical value (see table below) indicates that the sucrose sample was sweeter than the sweetness enhancer sample.

| sucrose solution [% wt/wt] | sample sweetness (trilobatin, 100 ppm) | R-index | Critical values [%] | p-value |
| --- | --- | --- | --- | --- |
| 0.5% Sucrose | Isosweet | 44% | 35.39-64.61 | P > 0.05 |
| 1.0% Sucrose | Less sweet | 13% | 35.39-64.61 | P < 0.05 |
| 1.5% Sucrose | Less sweet | 0% | 35.39-64.61 | P < 0.05 |
| 2.0% Sucrose | Less sweet | 0% | 35.39-64.61 | P < 0.05 |

An R index of 44%, which is within the critical value range (35.39-64.61%), means the 100 ppm trilobatin in water sample was isosweet to 0.5% sucrose. An R index of 0-13%, which is below the lower critical value, means the sample was less sweet than either 1%, 1.5% and 2% sucrose. Thus, the 100 ppm trilobatin in water sample was perceived to be isointense to a 0.5% sucrose solution.

1c. Isointensity of 200 ppm Trilobatin

The sensory evaluation was conducted using the method described in example 1 b. The panels consisted of 7 sweet sensitive panelists. Panelists were presented with 0.5%, 1%, and 1.5% sucrose solutions in water and a fourth sample of 200 ppm trilobatin in water. Panelists were asked to rank the samples from low to high with respect to perceived sweet taste. 200 ppm trilobatin in water was determined to be isosweet to 1% sucrose.

The sweetness detection threshold for individuals within the average consumer group varies from below 0.4% to 0.7% sucrose or more. All examples were performed with sweet sensitive panelists able to detect at least 0.5% sucrose or less. Extrapolating from examples 1 a, b, and c, the concentration detectable by the average consumer will therefore be higher, and the average concentration near the sweetness detection threshold of the average consumer will be about 100 to 200 ppm.

1d. Isointensity of 10, 15 and 20 ppm HDG

Determination of the Sweetness Detection Threshold of HDG.

All examples were performed with sweet sensitive panelists able to detect at least 0.5% of sucrose or less, unless stated otherwise. The concentration detectable by the average consumer will be higher. The results were obtained using 20 panelists in two replications.

The sucrose concentration that tastes isointense in sweetness to HDG was determined using samples of 15 ppm and 20 ppm, each of which was directly compared to a sucrose sample (sucrose solutions of 0.5%, 1%, 1.5% and 2% concentration). Fifteen milliliters of each blinded sample was presented, at room temperature, in random order to 20 sweet sensitive panelists. In two replications (over 1 session), panelists were asked to rank the solutions, from least sweet to most sweet. The data was subjected to an R-index analysis. The results are indicated in the tables below.

| sucrose solution [% wt/wt] | sample sweetness (HDG, 15 ppm) | R-index | Critical values [%] | Significantly different (p < 0.05) |
|---|---|---|---|---|
| 0.5% Sucrose | sweeter | 85% | 37.26-62.74 | Yes |
| 1.0% Sucrose | less sweet | 31% | 37.26-62.74 | Yes |
| 1.5% Sucrose | less sweet | 10% | 37.26-62.74 | Yes |
| 2.0% Sucrose | less sweet | 1% | 37.26-62.74 | Yes |

| sucrose solution [% wt/wt] | sample sweetness (HDG, 20 ppm) | R-index | Critical values [%] | Significantly different (p < 0.05) |
|---|---|---|---|---|
| 0.5% Sucrose | Sweeter | 92% | 37.26-62.74 | Yes |
| 1.0% Sucrose | Isosweet | 51% | 37.26-62.74 | No |
| 1.5% Sucrose | Less sweet | 33% | 37.26-62.74 | Yes |
| 2.0% Sucrose | Less sweet | 4% | 37.26-62.74 | Yes |

15 ppm HDG was perceived to be significantly sweeter than a 0.5% sucrose sample (the calculated R-index value exceeds the critical values), but significantly less sweet than 1.0%, 1.5% and 2% sucrose samples (the calculated R-index values less than the critical values).

20 ppm HDG was perceived to be isointense to the sweetness of the 1.0% sucrose sample, significantly sweeter than 0.5% sucrose (the calculated R-index value was exceeds the critical value), and significantly less sweet than 1.5% and 2% sucrose (the calculated R-index values less than the critical values).

Further three small panel testings were performed. HDG samples were prepared in concentrations of 5 ppm, 10 ppm, 15 ppm, and 20 ppm in water. All the samples were coded (presented blind) and given to the panel in random order. The panel was also presented with sucrose solutions for comparison. The panel was asked to taste each sample and rank the samples from the least sweet to most sweet. The results are indicated in the table below.

| Sample concentration (HDG in water) | Rank and taste | Isointensity to sucrose |
|---|---|---|
| 5 ppm | 1 - not sweet | 0% sucrose (water) |
| 10 ppm | 2 - very slightly sweet | 0.5% sucrose |
| 15 ppm | 3 - slightly sweet | 0.75% sucrose |
| 20 ppm | 4 - sweet | 1% sucrose |

The 5 ppm solution of HDG was found not to be sweet (below the sweetness detection threshold). The 10 ppm HDG was found to be very slightly sweet, isosweet to 0.5% sucrose. Thus the sweetness threshold of HDG detected by sweet sensitive individuals (which are more sensitive than the average consumer) is at about 10 ppm. The 15 ppm and 20 ppm samples were identified as slightly sweet and sweet (isosweet to 0.75% sucrose and 1% sucrose, respectively).

Example 2a

Isointensity of 100 ppm Trilobatin in 7% Sucrose Solution

The sensory evaluation was conducted using a ranking method. Samples at ambient temperature were randomly presented in 15 ml blind aliquots (unidentifiable by panelists). Panels consisted of 15 sweet sensitive subjects and samples were presented in 2 replications over 1 session. After tasting each sample, the mouth was rinsed thoroughly with water at ambient temperature prior to tasting the next sample. Panelists were presented with 7%, 8%, 9%, 10% and 11% sucrose solutions in water and a sixth sample of 100 ppm trilobatin in 7% sucrose. Subjects were asked to rank the samples from low to high with respect to perceived sweet taste. R-indices were calculated for 100 ppm trilobatin in 7% sucrose versus either 7%, 8%, 9%, 10% or 11% sucrose.

| Sucrose solution [% wt/wt] | sample sweetness (7% sucrose + 100 ppm trilobatin) | R-index | critical values [%] | p-value |
|---|---|---|---|---|
| 7% Sucrose | Sweeter | 79% | 35.39-64.61 | P < 0.05 |
| 8% Sucrose | Isosweet | 38% | 35.39-64.61 | P > 0.05 |
| 9% Sucrose | Less sweet | 12% | 35.39-64.61 | P < 0.05 |
| 10% Sucrose | Less sweet | 1% | 35.39-64.61 | P < 0.05 |
| 11% Sucrose | Less sweet | 0% | 35.39-64.61 | P < 0.05 |

An R index of 0-12%, which is below the lower critical value (35.39%), shows that the sample is less sweet than either 9%, 10% or 11% sucrose. An R-index of 79%, which is greater than the higher critical value (64.61%) shows that the 100 ppm trilobatin in 7% sucrose sample was significantly sweeter than 7% sucrose. An R-index of 38%, which is within the critical value range (35.39-64.61%), shows that the sample was isosweet to 8% sucrose. Accordingly, 100 ppm trilobatin in 7% sucrose adds 1° Brix of sucrose sweetness intensity to enhance the sweetness so that 7% tastes equivalent to an 8% sucrose solution.

To further determine the sweetness enhancement, a direct comparison of 100 ppm trilobatin in 7% sucrose with 7.5% sucrose solution was carried out by 8 sweet sensitive panelists and all panelists indicated that the 100 ppm trilobatin in 7% sucrose sample tasted significantly sweeter than the 7.5% sucrose solution, which is the sucrose concentration that the 100 ppm trilobatin in 7% sucrose sample would be expected to taste isosweet to, assuming a merely additive effect (compare example 1 b, the sweetness of 100 ppm trilobatin in water is equivalent to 0.5% sucrose). However, the 100 ppm trilobatin in 7% sucrose sample was found to be isosweet to 8% sucrose, clearly above a merely additive effect.

Example 2b

Isointensity of 20 ppm HDG in 7% Sugar Solution

The sensory evaluation was conducted essentially as described above for trilobatin demonstrating the results as indicated in the table below. Panels consisted of 20 sweet sensitive subjects and samples were presented in 2 replications over 1 session. Panelists were presented with 7%, 8%, 9% and 10% sucrose solutions in water and a fifth sample of 20 ppm HDG in 7% sucrose in random order. Subjects were asked to rank the samples from low to high with respect to perceived sweet taste.

| Sucrose solution [% wt/wt] | sample sweetness (7% sucrose + 20 ppm HDG) | R-index | critical values [%] | p-value |
|---|---|---|---|---|
| 7% Sucrose | Sweeter | 94.8% | 37.11-62.89 | P < 0.05 |
| 8% Sucrose | Isosweet | 62.6% | 37.11-62.89 | P > 0.05 |
| 9% Sucrose | Isosweet | 46.0% | 37.11-62.89 | P > 0.05 |
| 10% Sucrose | Less sweet | 6.8% | 37.11-62.89 | P < 0.05 |

An R index of 6.8%, which is below the lower critical value (37.11%), shows that the 20 ppm HDG in 7% sucrose sample was less sweet than 10% sucrose. An R-index of 94.8%, which is greater than the higher critical value (62.89%) shows that the sample was significantly sweeter than 7% sucrose. An R-index of 46.0%, which is within the critical value range (37.11-62.89%), shows that the sample was isosweet to 9% sucrose. An R-index of 62.6%, which falls within the critical value range (37.11-62.89%) but almost equal to the higher critical value (37.11-62.89%), shows that the sample was also isosweet to 8% sucrose. Thus, the sweetness of 20 ppm of HDG in 7% sugar is more towards 9% glucose, or at least 8.5% or higher.

Accordingly, 20 ppm HDG in 7% sucrose added about 1.5-2° Brix of sucrose sweetness intensity to enhance the sweetness so that 7% tasted equivalent to an 8.5-9% sucrose solution.

Example 3

Ranking Test of 100 ppm Trilobatin+60 ppm Swingle Extract in 7% Sucrose, Determining its Sucrose Isointensity A 100 ppm trilobatin+60 ppm swingle extract in 7% sucrose sample was evaluated for isointensity to 7-11% sucrose solutions (compare table) using the method described in example 2. The results are indicated in the table below.

| Sucrose solution [% wt/wt] | Sample sweetness (100 ppm trilobatin + 60 ppm swingle in 7% sucrose) | R-index [%] | Critical values [%] | p-value |
|---|---|---|---|---|
| 7% | Sweeter | 97% | 35.39-64.61 | P < 0.05 |
| 8% | Sweeter | 79% | 35.39-64.61 | P < 0.05 |
| 9% | Isosweet | 52% | 35.39-64.61 | P > 0.05 |
| 10% | Less sweet | 25% | 35.39-64.61 | P < 0.05 |
| 11% | less sweet | 4% | 35.39-64.61 | P < 0.05 |

An R-index from 79-97%, which is greater than the higher critical value (64.61%), shows that the 100 ppm trilobatin+ 60 ppm swingle in 7% sucrose sample was significantly sweeter than 7% and 8% sucrose. An R-index of 52%, which is between the critical value limits (35.39-64.61%), shows that the sample was isosweet to 9% sucrose. An R-index of 4-25%, which is below the lower critical value (35.39%), shows that the sample was significantly less sweet than 10% and 11% sucrose.

As a control, 100 ppm trilobatin in water was tested (see example 1 b) and found to have a sweetness isointensity to 0.5% sucrose.

Further, 60 ppm swingle in water was tested as described in example 1 b for trilobatin and was found to have a sweetness isointensity to above 0.5% but below 1% sucrose (0.75% by interpolation as shown in example 6).

Accordingly, the 100 ppm trilobatin in 7% sucrose sample (isotense to below 0.5% sucrose) and the 60 ppm swingle extract sample (isosweet to below 1% sucrose, interpolated to 0.75% sucrose), would be expected to be isosweet to below 8.25% sucrose assuming an additive effect.

However, the determined isointensity was 9% sucrose, which is clearly above a merely additive effect.

Example 4

Ranking Test of 100 ppm Trilobatin+60 ppm Swingle Extract+2 ppm NHDC in 7% Sucrose, Determining its Sucrose Isointensity A sample of 100 ppm trilobatin+60 ppm swingle extract+2 ppm NHDC in 7% sucrose was evaluated for sweetness isointensity to 7-11% sucrose solutions (compare table) using the ranking method described in example 2. The results are indicated in the table below.

| Sucrose solution [% wt/wt] | Sample sweetness | R-index | Critical values [%] | p-value |
|---|---|---|---|---|
| 7% | Sweeter | 98% | 35.39-64.61 | P < 0.05 |
| 8% | Sweeter | 96% | 35.39-64.61 | P < 0.05 |
| 9% | Sweeter | 81% | 35.39-64.61 | P < 0.05 |
| 10% | Isosweet | 56% | 35.39-64.61 | P > 0.05 |
| 11% | Less sweet | 28% | 35.39-64.61 | P < 0.05 |

An R-index from 81-98%, which is greater than the upper critical value (64.61%), shows that the 7% sucrose+100 ppm trilobatin+2 ppm NHDC+60 ppm swingle sample was significantly sweeter than 7%, 8%, and 9% sucrose. An R-index of 56%, which is within the critical value limits (35.39-64.61%), means the sample was isosweet to 10% sucrose. An R index of 28%, which is below the lower critical value (35.39%), means the sample was less sweet than 11% sucrose.

2 ppm NHDC in water had a sweetness isointense to 0.5% sucrose (see example 7). The 100 ppm trilobatin in water had a sweetness isointense to 0.5% sucrose. The 60 ppm swingle in water had an isointensity of above 0.5% sucrose but below 1% sucrose (0.75% by interpolation as shown in example 5).

Accordingly, the 7% sucrose+2 ppm NHDC (isosweet to 0.5% sucrose)+100 ppm trilobatin (isotense to 0.5% sucrose)+60 ppm swingle extract (isosweet to below 1% sucrose, interpolated to 0.75% sucrose) sample would be expected to be isosweet to below 9% sucrose, or below 8.75% sucrose by interpolation, assuming an additive effect.

However, the determined sweetness isointensity was equivalent to 10% sucrose, which is clearly above a merely additive effect.

Example 5

Sucrose Isointensity of 100 ppm Trilobatin+Combination of Two Optional Sweetness Enhancers in a 7% Sucrose Cola Beverage, Determining its Sucrose Isointensity The sensory evaluation was conducted by direct comparison. Samples were presented at ambient temperature in 15 ml blind aliquots. Panels consisted of 7 sweet sensitive panelists. After tasting each sample, the mouth was rinsed thoroughly with water at ambient temperature prior to tasting the next sample. Panelists were presented with a 100 ppm trilobatin+optional enhancers sample in a 7% sucrose cola beverage and a reference of a 10% sucrose cola beverage. Panelists were asked to taste the reference and then the sample to determine the relative sweetness.

5a—Combination with 60 ppm Swingle Extract+2 ppm NHDC

The tested sample contained 100 ppm trilobatin+60 ppm Swingle extract+2 ppm NHDC in a 7% sucrose cola beverage. The results are indicated in the table below

| Cola Reference (10% sucrose) | Sample sweetness (7% sucrose) |
|---|---|
| 5/7 | isosweet |
| 1/7 | Sweeter |
| 1/7 | less sweet |

Among the 7 panelists, five chose both the sample and reference as equally sweet and one each chose either sample or reference as sweeter.

5b—Combination with 30 ppm Rebaudioside A+2 ppm NHDC

The example was conducted as described in example 5a above, except that rebaudioside A was used instead of swingle extract.

| Cola Reference (10% sucrose) | Sample sweetness (7% sucrose) |
|---|---|
| 5/7 | isosweet |
| 2/7 | less sweet |

Among the 7 panelists, five chose both the sample and reference as equally sweet and 2 chose the reference as sweeter.

Examples 5 a and b demonstrate that not only is trilobatin able to enhance sweetness considerably on its own, but it can also be combined with other sweetness enhancers to further enhance sweetness (here shown for swingle extract/rebaudioside A and NHDC). Notably, when sweetness enhancers are combined, the effect may be similar or even less, for example when compounds have a similar working mechanism no further improvement may be reached or the combined compounds may even negatively influence each other or compounds they are interacting with. This is not the case for trilobatin when combined with swingle extract or rebaudiosides or NHDC.

Example 6—Sweetness of Swingle Extract in Water

Forced Choice Test of 60 ppm Swingle Extract in Water Versus 0%, 0.5% and 1% Sucrose The test samples were evaluated by a sensory panel of 10 sweet sensitive panelists. Samples were presented in 3 replicates to each panelist to give n=30 evaluations for each panel. The sensory evaluation was conducted using a forced choice method. Samples were presented blind, unidentifiable by panelists. In each replicate, the 60 ppm swingle extract in water sample was compared by panelists to 0% sucrose, and/or 0.5% sucrose, and/or 1% sucrose. Panelists were instructed that they had to choose one of the samples as sweeter. The data was analyzed using beta-binomial analysis. Further, panelists were asked to rate each presented sample for sweetness using the generalized labeled magnitude scale (0=no sweetness; 10=strongest imaginable sensation of any kind). The rating data was compared using the paired t-test.

Results of the Forced Choice Test:

| Test run | Sucrose [% wt/wt] | Number panelists choosing 60 ppm swingle in water as sweeter | Number panelists choosing 0% or 1% sucrose as sweeter | Significance level (forced choice) |
|---|---|---|---|---|
| 1 | 0 | 30/30 | 0/30 | p < 0.001 |
| 2 | 0.5 | 28/30 | 2/30 | p < 0.001 |
| 3 | 1 | 6/30 | 24/30 | p < 0.001 |

Results of the Rating Test:

| Test run | 60 ppm swingle in water | 0% sucrose | 1% sucrose | Significance level |
|---|---|---|---|---|
| 1 | 0.63 ± 0.09 | 0.1 ± 0.04 | | p < 0.001 |
| 3 | 0.58 ± 0.06 | | 0.72 ± 0.06 | p < 0.001 |

1—Compared to 0% sucrose/water, the 60 ppm swingle in water sample was perceived as sweeter by all panelists (30 of 30 panelists, with a statistical significance level for the forced choice of p<0.001). The low sweetness intensity rating of 0.63 reflects the very weak perceivable sweetness (compare the 0% sucrose with a rating of 0.1. The highest imaginable sweetness rates as 10).

2—Compared to 0.5% sucrose, the 60 ppm swingle sample in water was perceived as sweeter by a vast majority of the panelists (28 of 30 panelists, with a statistical significance level for the forced choice of p<0.001).

3—Compared to the weakly sweet 1% sucrose, the 60 ppm swingle extract in water sample was close to the threshold concentration for its sweet perception and significantly less sweet—the large majority of panelists (24 of 30) selected the weakly sweet 1% sucrose solution as being sweeter than the 60 ppm swingle extract solution with a statistical significance level for the forced choice of p<0.001. The low sweetness intensity rating of 0.58 for swingle extract in water versus 0.72 for 1% sucrose reflects the very weak perceivable sweetness of 60 ppm swingle which was significantly less than the sweetness of 1% sucrose. By interpolation, the sweetness of 60 ppm swingle extract was equivalent to about 0.75% sucrose.

Example 7—Sweetness of NHDC in Water

Ranking Test of 2 ppm NHDC in Water, Determining its Sucrose Isointensity

A 2 ppm NHDC in water sample was evaluated for its isointensity to 0.5 and 1% sucrose solutions using the ranking method described in example 3b. The results are indicated in the table below.

| sucrose solutions [% wt/wt] | NHDC sample sweetness | R-index [%] | Critical values [%] | p-value |
|---|---|---|---|---|
| 0.5% | isosweet | 41% | 35.39-64.61 | P < 0.05 |
| 1% | less sweet | 5% | 35.39-64.61 | P < 0.05 |

An R-index 41%, which is not significantly above the critical value (35.39%), shows that the 2 ppm NHDC sample was isosweet to 0.5% sucrose. An R-index of 5%, which is below the critical value (35.39%), shows that the 2 ppm NHDC sample was significantly less sweet than 1% sucrose.

While the sweet enhancing compositions, sweetened consumables and related methods have been described above in connection with certain illustrative embodiments, it is to be understood that other similar embodiments may be used or modifications and additions may be made to the described embodiments for performing the same function. Further, all embodiments disclosed are not necessarily in the alternative, as various embodiments may be combined to provide the desired characteristics. Variations can be made by one having ordinary skill in the art without departing from the spirit and scope of the disclosure. Therefore, the sweetness enhancing compositions, sweetened consumables and related methods should not be limited to any single embodiment, but rather construed in breadth and scope in accordance with the recitation of the attached claims.

Example 8

Sweetness Detection Threshold in Yoghurt

Trilobatin was tested by 6 sweet sensitive panelists in plain nonfat yoghurt. Yoghurt samples were 500 ppm trilobatin, 1% sucrose, and 2% sucrose. Panelists compared the 500 ppm trilobatin sample to each sucrose sample and compared the sweetness, the results are indicated in the table below.

| Sucrose sample | Sweetness of 500 ppm trilobatin sample |
| --- | --- |
| 1% sucrose | slightly less sweet/similarly sweet |
| 2% sucrose | less sweet |

The sweetness detection threshold in yoghurt is higher than in water, due to the presence of acids, proteins and the viscosity. 500 ppm trilobatin in yoghurt is a concentration still near the sweetness detection threshold in yoghurt. A concentration of 550 ppm, 600 ppm, 650 ppm, 700 ppm or 750 ppm may still be a concentration near the sweetness detection threshold.

Example 9

Sweetness Enhancement in Yoghurt

Trilobatin was tested by 6 sweet sensitive panelists in plain nonfat yoghurt. Samples of 62.5 ppm, 125 ppm, and 500 ppm trilobatin in yoghurt sweetened with 5% sucrose were compared by panelists to a 5% sucrose sweetened yoghurt and a 7% sucrose sweetened yoghurt sample; the results are indicated in the table below.

| Trilobatin sample in 5% sucrose [ppm] | sweetness trilobatin compared to 5% sucrose sample | sweetness trilobatin compared to 7% sucrose sample |
| --- | --- | --- |
| 62.5 | + sweeter | less sweet |
| 125 | ++ sweeter | less sweet |
| 500 ppm | ++++ much sweeter, slight sour off-note | similarly sweet, slight sour off-note |

The results show a sweetness enhancement effect equivalent to an added 1% sucrose (5% sucrose tastes like 7%) when used in a concentration of 500 ppm (own sweetness equivalent to 1% sucrose, as shown in example 8).

Example 10

Sweetness Detection Threshold in Milk

Trilobatin was tested by 6 panelists in whole milk.

Milk samples were 62.5 ppm, 125 ppm, 250 ppm, 500 ppm trilobatin; 1% sucrose, and 2% sucrose. Panelists compared the trilobatin samples to each sucrose sample and compared the sweetness, the results are indicated in the table below.

| Trilobatin samples [ppm] | Trilobatin sample sweetness compared to sucrose |
| --- | --- |
| 62.5 | below 1% sucrose (6/6) |
| 125 | below 1% sucrose (6/6) |
| 250 | below 1% sucrose (6/6) |
| 500 | similar to 1% sucrose (3/6) |
|  | below 1% sucrose (3/6) |

The sweetness detection threshold in milk is higher than in water. All panelists (6/6) found 62.5 ppm trilobatin, 125 ppm and 250 ppm trilobatin to have a sweetness below that of 1% sucrose in milk. For 500 ppm trilobatin, half of the panelists (3/6) found the sweetness to be isosweet to 1% sucrose, the other half found the sweetness to be below that of 1% sucrose.

500 ppm trilobatin in milk is a concentration below or near the sweetness detection threshold in milk. A concentration of 550 ppm, 600 ppm, 650 ppm, 700 ppm or 750 ppm may still be a concentration near the sweetness detection threshold.

Example 11

Sweetness Enhancement in Cereals

Trilobatin was tested by 4 sweet sensitive panelists in cereal samples (cereals from Kix, General Mills; USA). The cereal is a comparatively low sugar product and contains 3 g sucrose per 30 g cereal. Panelists tested the samples in whole milk.

To the cereal samples, sucrose was topically added by spraying the corresponding amount of a 10% sucrose solution in water to give 1%. The samples were baked at 250° C. for about 15 minutes in a convection oven to dry/remove the water. Similarly, trilobatin was applied to cereal samples as a 0.1% solution in 50/50 w/w ethanol/water to give various trilobatin concentrations (100 ppm, 200 ppm, 400 ppm).

The following cereal samples were compared:

| Trilobatin cereal sample | Sweetness trilobatin sample |
| --- | --- |
| 100 ppm | less sweet than 1% sucrose |
| 200 ppm | sweeter than 1% sucrose |
| 400 ppm | much sweeter than 1% sucrose, too sweet |

200 ppm trilobatin produced a pleasant taste sweeter than 1% sucrose, 400 ppm was much sweeter and considered too sweet. This shows that the sweetness of sweetened cereals can be enhanced by addition of trilobatin.

Example 12

Sweetness Enhancement by 10 ppm HDG

The degree of sweetness enhancement of HDG was tested by determining the isointensity of the HDG-enhanced samples in comparison to sucrose samples. The samples contained 10 ppm HDG in 7% sucrose (HDG-10), and various sucrose solutions of different concentration in water (7%, 8%, 9%, and 10%).

15 ml of each sample was presented at room temperature and in random order to 20 sweet sensitive panelists. In two replications over 1 session, panelists were asked to compare and rank the samples from least sweet to most sweet. The results were subjected to an R-index analysis and are presented in the table below. The critical value indicates the range wherein the difference of two samples is non-significant. An R-index outside of that range indicates significantly different samples.

| HDG-ppm vs. sucrose [%] | R-index [%] | Critical Value [%] | Significantly different (p < 0.05) | sweetness HDG sample |
|---|---|---|---|---|
| HDG-10/ 7% vs. 7% | 75.2 | 37.1 to 62.9 | Yes | sweeter |
| HDG-10/ 7% vs. 8% | 37.5 | 37.1 to 62.9 | No | isosweet |
| HDG-10/ 7% vs. 9% | 10.7 | 37.1 to 62.9 | Yes | less |
| HDG-10/ 7% vs. 10% | 0.6 | 37.1 to 62.9 | Yes | less |

The HDG sample (10 ppm HDG in 7% sucrose) was perceived to be significantly sweeter than a 7% sucrose solution (the calculated R-index value exceeding than the higher critical value (62.9%) at p>0.05), isosweet to the 8% sucrose sample, and significantly less sweet than the 9% and 10% sucrose samples (the calculated R-index values below the lower critical value (37.1) at p>0.05). An R-index of 37.5, which is within the critical value range (37.1-62.9%), shows that the sample was isosweet to 8% sucrose. Accordingly, 10 ppm HDG in 7% sucrose adds about 1° Brix of sucrose sweetness intensity to enhance the sweetness so that 7% tastes equivalent to an 8% sucrose solution.

Accordingly, since the HDG sample in a concentration of 10 ppm was found to be isosweet to 0.5% sucrose (compare example 1d), it would be expected to be isosweet to 7.5% assuming a merely additive effect. However, the HDG in 7% sucrose sample was found to be isosweet to 8% sucrose, clearly above a merely additive effect.

Example 13

Sweetness of Trilobatin (750 ppm) in Yogurt

The sucrose concentration isointense to 750 ppm trilobatin in a plain yogurt base was determined as follows.

Samples contained a plain yogurt base with 750 ppm trilobatin, or the same plain yogurt base with sucrose in various concentrations (0%, 0.5%, 1.0%, 1.5%, and 2.0% sucrose).

30 ml of each yogurt sample was served cold, in random order, to 21 sweet sensitive panelists. In two replications over 1 session, panelists were asked to rank the samples from least sweet to most sweet. The data was subjected to an R-index analysis. The critical value range given indicates the non-significant range, an R-index outside of this range is significantly different as indicated (p<0.05).

| yogurt samples 750 ppm TL vs. % sucrose | R-index [%] | Critical Value [%] | Significantly different (p < 0.05) | sweetness TL sample |
|---|---|---|---|---|
| TL vs. 0% | 82.6 | 37.4 to 62.6 | Yes | sweeter |
| TL vs. 0.5% | 58.5 | 37.4 to 62.6 | No | isosweet |
| TL vs. 1% | 14.7 | 37.4 to 62.6 | Yes | less |
| TL vs. 1.5% | 4.4 | 37.4 to 62.6 | Yes | less |
| TL vs. 2% | 3.3 | 37.4 to 62.6 | Yes | less |

Panelists perceived 750 ppm trilobatin in plain yogurt as significantly sweeter than the plain yogurt base alone (the calculated R-index value was greater than the higher critical value (62.6%), but significantly less sweet than 1.0%, 1.5% and 2% sucrose in plain yogurt (the calculated R-index values are below the lower critical values (37.4%) at p>0.05).

In plain yogurt, the sweetness intensity of 750 ppm trilobatin was perceived to be isointense to 0.5% sucrose.

Example 14

Sweetness of HDG in a Cola Beverage 20 ppm of HDG in a cola beverage sweetened with 7% sucrose was compared to control samples (cola without HDG and sweetened with 7 or 9% sucrose) by 9 panelists.

Panelists were instructed to taste and compare the samples in their sweetness intensity and profile.

The HDG in 7% cola sample was found to be significantly sweeter than the 7% sucrose sample by all panelists, but not as sweet as the 9% sucrose control. It was described to have a non-lingering taste profile similar to the sucrose controls in sweetness onset and duration.

The invention claimed is:

1. A sweetened consumable comprising
   a) at least 0.0001% (w/w) of at least one sweetener, including natural and artificial sweeteners, wherein said sweetener includes sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof,
   wherein said at least one sweetener or sweetener combination is present in a concentration above the sweetness detection threshold in a concentration isosweet from 2% to 15% sucrose, and
   b) hesperitin dihydrochalcone 4''-beta-D-glucoside (HDG) in a concentration near its sweetness detection threshold in said consumable.

2. The sweetened consumable according to claim 1 wherein the HDG concentration is from 0.3 to 20 ppm.

3. The sweetened consumable according to claim 1 wherein the consumable is selected from dairy product, dairy-derived product and dairy-alternative product and wherein the HDG concentration is from 1 to 75 ppm.

4. The sweetened consumable according to claim 1 wherein the consumable has a pH below 6.5 and the HDG concentration is from 0.6 to 30 ppm.

5. The sweetened consumable according to claim 1 wherein the consumable has a pH below 5 and the HDG concentration is from 0.6 to 40 ppm.

6. The sweetened consumable according to claim 1, wherein the consumable is a water-based consumable selected from the group consisting of water, aqueous beverage, enhanced/slightly sweetened water drink, mineral water, carbonated beverage, non-carbonated beverage, carbonated water, still water, soft drink, non-alcoholic drink, alcoholic drink, beer, wine, liquor, fruit drink, juice, fruit juice, vegetable juice, broth drink, coffee, tea, black tea, green tea, oolong tea, herbal tea, cocoa (water-based), tea-based drink, coffee-based drinks, cocoa-based drink, syrup, frozen fruit, frozen fruit juice, water-based ice, fruit ice, sorbet, dressing, salad dressing, sauce, soup, beverage botanical materials (whole or ground), and instant powder for reconstitution (coffee beans, ground coffee, instant coffee, cocoa beans, cocoa powder, instant cocoa, tea leaves, instant tea powder).

7. The sweetened consumable according to claim 1, wherein the consumable is a solid dry consumable selected from the group consisting of cereals, baked food products, biscuits, bread, breakfast cereal, cereal bar, energy bars/nutritional bars, granola, cakes, cookies, crackers, donuts, muffins, pastries, confectioneries, chocolate, fondant, hard candy, marshmallow, pressed tablets, snack foods, botanical materials (whole or ground), and instant powders for reconstitution.

8. The sweetened consumable according to claim 1, wherein the consumable is a dairy product, dairy-derived product or dairy-alternative product, selected from the group consisting of milk, fluid milk, cultured milk product, cultured and noncultured dairy-based drink, cultured milk product cultured with lactobacillus, yoghurt, yoghurt-based beverage, smoothy, lassi, milk shake, acidified milk, acidified milk beverage, butter milk, kefir, milk-based beverages, milk/juice blend, fermented milk beverage, icecream, dessert, sour cream, dip, salad dressing, cottage cheese, frozen yoghurt, soy milk, rice milk, soy drink, and rice milk drink.

9. The sweetened consumable according to claim 1 further comprising at least one of naringin dihydrochalcone, mogroside V, swingle extract, rubusoside, rubus extract, rebaudioside A, stevioside and neohesperidin dihydrochalcone, or combinations thereof.

10. The sweetened consumable according to claim 9 wherein naringin dihydrochalcone is present in a concentration of from 2 to 60 ppm.

11. The sweetened consumable according to claim 9 wherein mogroside V is present in a concentration of from 0.4 to 12.5 ppm.

12. The sweetened consumable according to claim 9 wherein swingle extract is present in a concentration of from 2 to 60 ppm.

13. The sweetened consumable according to claim 9 wherein rubusoside is present in a concentration of from 1.4 to 56 ppm.

14. The sweetened consumable according to claim 9 wherein rubus extract is present in a concentration of from 2 to 80 ppm.

15. The sweetened consumable according to claim 9 wherein rebaudioside A is present in a concentration of from 1 to 30 ppm.

16. The sweetened consumable according to claim 9 wherein stevioside is present in a concentration of from 2 to 60 ppm.

17. The sweetened consumable according to claim 9 wherein neohesperidin dihydrochalcone is present in a concentration of from 1 to 5 ppm.

18. The sweetened consumable according to claim 9 which is a beverage.

19. A sweetness enhancer composition for enhancing the sweetness of a consumable comprising
a sweetness enhancer consisting of hesperitin dihydrochalcone 4"-beta-D-glucoside (HDG) in a concentration near its sweetness detection threshold in a consumable; and
at least one additional compound selected from the group consisting of naringin dihydrochalcone, mogroside V, swingle extract, rubusoside, rubus extract, rebaudioside A, stevioside and neohesperidin dihydrochalcone, or combinations thereof.

* * * * *